Oct. 9, 1962   D. E. BENTLY ET AL   3,057,195
FORCE MEASURING SYSTEM
Filed Jan. 13, 1958   2 Sheets-Sheet 1

Inventors:
DONALD E. BENTLY
ROBERT L. PRICE
By Howard F. Rhea
   Attorney

Oct. 9, 1962

D. E. BENTLY ET AL 3,057,195

FORCE MEASURING SYSTEM

Filed Jan. 13, 1958

Inventors:
DONALD E. BENTLY
ROBERT L. PRICE
By Howard F. Rhea
Attorney 3,057,195
FORCE MEASURING SYSTEM
Donald E. Bently, Berkeley, and Robert L. Price, Moraga, Calif., assignors, by mesne assignments, to Systron-Donner Corporation, Concord, Calif., a corporation of California
Filed Jan. 13, 1958, Ser. No. 708,433
14 Claims. (Cl. 73—141)

This invention relates to force measuring systems and more particularly to force measuring systems of the servo type, employing sensing elements which vary the parameters of oscillatory circuits.

Force measuring systems of various types employing oscillatory circuits are well known. In the usual circuit, an input force is caused to vary the tuning or frequency of an oscillator and the resulting shift in frequency detected in various ways to effect the measurement. In other circuits, the input force is caused to vary both frequency and amplitude or amplitude alone. The variation is usually accomplished by changing tuning elements and detection is accomplished in the various methods known to the art.

Such prior art circuits generally have endeavored to cope with problems relative to stability, sensitivity and susceptibility to inputs other than the force to be measured. Such disabilities often arise from the circuit design values necessary to obtain the required sensitivity range or other features. The high frequencies often necessary have been another limiting factor. Many prior art systems have been sensitive to vibration, subject to microphonics, undamped for desired ranges of operating frequencies, sensitive to physical positioning, and so on. Outputs have generally been of a pulse type and have required special circuitry to yield the desired measurement information. It is an object of the invention herein to overcome in large measure these disabilities and limitations.

The invention herein relates to a force measuring system employing an oscillatory circuit wherein the force to be measured causes a change in the effective Q of the load inductance. Servo damping is obtained through critical damping by the proper choice of circuit components, without auxiliary circuitry. In the invention, a movable vane of a material having a high resisitivity per unit area is caused to reflect varying amounts of impedence into the plate or collector circuit of an oscillator and thereby affect the amplitude of oscillatory output. The amplitude variations thus created are detected, and, if desirable in the particular application, amplified and the output of the detector or amplifier employed to restrain the motion of the force sensing element. This output also yields measurement information. Relatively low frequencies are employed and low power levels are used in the sensing circuits. The variation in spacing necessary to obtain substantial output is very slight.

In the invention, considerable latitude is possible in the design of the oscillator itself. Various systems may be used, within certain design considerations. These considerations include requirements that the oscillatory circuit include an inductance in the plate or collector circuit, and include component values preferably such that the oscillator is normally operating near its threshold of oscillation, so that a variation in tank Q gives a substantial variation in the level of the output.

It is an object of the invention to provide a force measuring system of great sensitivity and stability, which is relatively insensitive to inputs other than the force to be measured. It is also an object of the invention to provide a force measuring system employing simple and straightforward circuity and design.

It is an object of the invention to provide a force measuring system wherein the movable sensitive force sensing element does not affect frequency, and which consequently may readily be separated from the oscillatory portions of the circuit, giving flexibility of design and allowing miniaturization of the sensing element if desired. In this connection, the low frequencies and low power levels employed are of material benefit.

Further objects of the invention are to provide a servo force measuring system which is highly stable and non-critical of adjustment and which is therefore economical of manufacture and operation.

It is also an object of the invention to provide a servo force measuring system wherein very slight, practically infinitesimal movements of the force sensitive element are sufficient to give very reliable indication of the force being measured notwithstanding the most adverse external and environmental conditions.

Other objects and advantages of the invention are that servo damping is readily obtainable through critical damping through the circuit components alone, notwithstanding the fact that servo loop gain may be extreme and that differing systems may have varying moments of inertia. Furthermore, it is an object of the invention that the oscillator furnished an output which is D.C. and not pulsed, which has lower output noise and which therefore has minimum interference with the bandpass of the servo loop under varying signal conditions, thereby avoiding the frequency limitations imposed in the usual pulsed output type of circuit.

Another advantage and object of the invention resides in its lack of sensitivity to microphonics and vibration. The invention imposes virtually no restraint regarding physical resonances.

A further object of the invention is to provide a force measuring system which is easily stabilized and which has low interaction between circuit components. Other objects and advantages will be understood from the figures and the detailed description hereinafter following, wherein.

Figure 1:
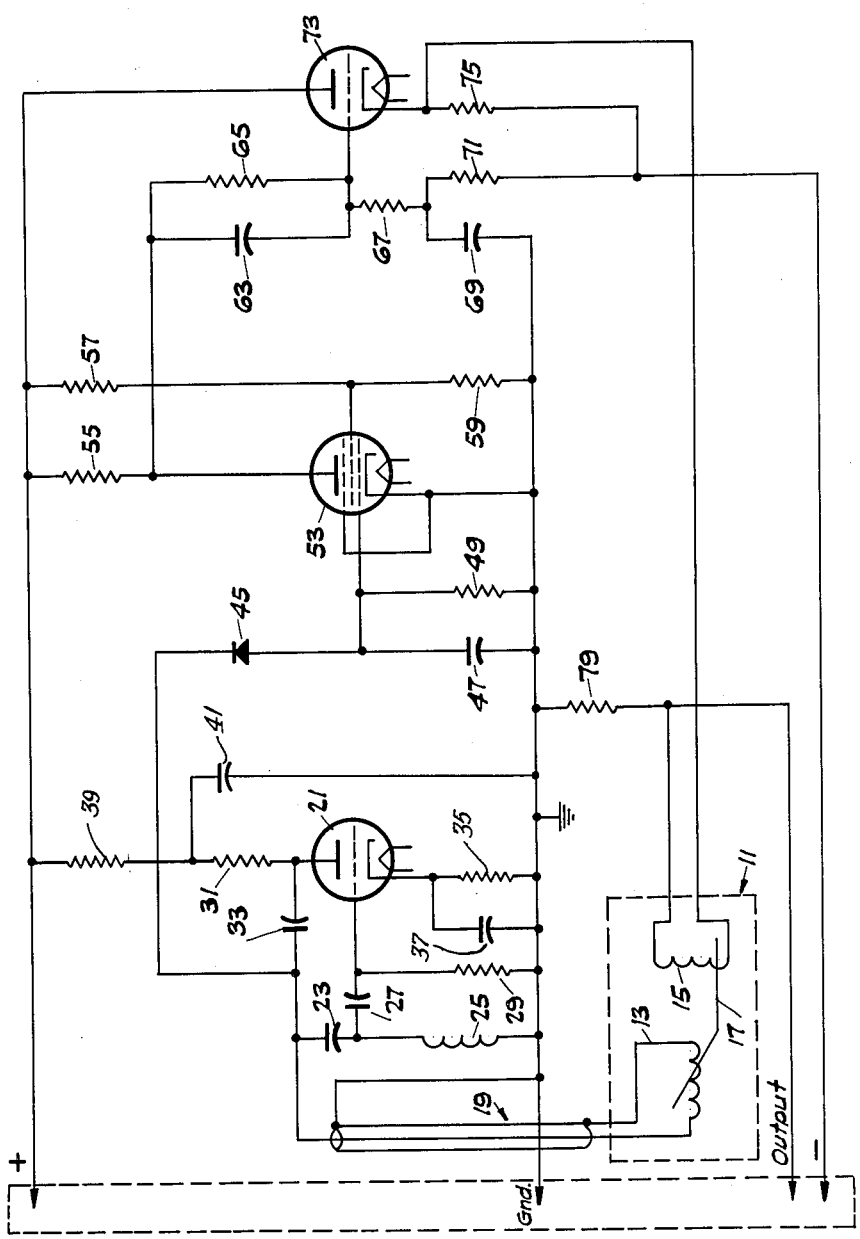
FIGURE 1 is a schematic diagram of an embodiment of the invention.

In the embodiment of FIGURE 1, force sensing system 11 includes a sensing inductance 13, a movable force sensitive element 17 and a servo restoring coil 15. Sensing inductance 13 serves as a part of the plate load circuit for the oscillator comprised of tube 21 and its associated components. The element 17 is preferably formed of an electrically conducting, non-magnetic material.

Force sensing system 11 is shown in dotted lines to indicate that it may be physically located apart from the circuits of FIGURE 1.

The force to be measured causes movement of movable force sensitive element 17. This motion causes a change in the effective loading of the oscillator plate circuit due to the influence of movable element 17 on sensing inductance 13. The variation in oscillatory output occasioned by this change in plate loading is detected, amplified and applied to servo restoring coil 15. Servo restoring coil 15 operates to restrain the original motion or tendency toward motion of movable force sensitive element 17 and as a consequence, in the usual arrangement, movable force sensitive element 17 actually moves very little. An output is taken in the embodiment shown, across servo restoring coil 15, and this output gives a direct indication of the force acting on movable element 17.

The oscillator of FIGURE 1 includes a tube 21 having a plate, a grid and a cathode, as shown. The grid of tube 21 is connected to a frequency determining tuned circuit, including a capacitance 27 in series with an inductance 25. A grid leak resistance 29 is connected between the grid of tube 21 and ground. The cathode of tube 21 is biased in the conventional manner by resistance 35, which resistance 35 is by-passed by capacitance 37. The plate load of tube 21 includes a resistance 31, and a capacitance 33 in series with a sensing inductance 13. The connections to sensing inductance 13 are preferably shielded by a shield 19 to avoid stray pick-up and other interfering signals.

Resistance 39 and capacitance 41 form a de-coupling network isolating the plate circuit of tube 21 from the balance of the circuit. Feedback between the plate and grid circuits of tube 21 is accomplished by feedback capacitance 23 and the plate to grid capacitance of tube 21. The constants of the circuit so far described, and especially the size of capacitance 23, are preferably chosen so that the oscillator operates near its threshold of oscillation. In this condition, a variation of the effective load, including sensing inductance 13, will have a greater effect on the amplitude of oscillatory output, as will appear more fully hereinafter.

The output of the oscillator is connected, as shown in FIGURE 1, to diode 45, which rectifies the oscillations. Capacitance 47 filters the output of diode 45, which output is applied to the grid of tube 53. Tube 53, with its associated components, functions as a D.C. amplifier, increasing the amplitude of the output of diode 45. Resistance 49 is the grid leak resistance for tube 53, in addition to functioning as a portion of the load and filter circuit for diode 45. Resistance 57 and 59 form a voltage divider network, providing the correct voltage for the screen grid of tube 53, and resistance 55 is the plate load for tube 53.

The output of the amplifier including tube 53 is applied to a phase shifting and load network, including capacitances 63 and 69 and resistances 65, 67 and 71.

A cathode follower circuit including tube 73 and its associate components serves to couple the output of the D.C. amplifier to servo restoring coil 15. Resistance 75 in the cathode circuit of tube 73 serves as the load impedence for the cathode follower, and an output taken on the cathode side of resistance 75 is fed through servo restoring coil 15 and resistance 79 to ground. The voltage fluctuations developed across resistance 79, which fluctuations are in accordance with the currents flowing through servo restoring coil 15, provide the output of the force measuring system. Resisance 79 may be replaced with other forms of impedance, such as an inductance or a capacitance to cause the circuit to measure forces such as rate of change of acceleration or velocity, rather than the acceleration or pressure measured in the embodiment shown.

In the operation of the circuit of FIGURE 1, the oscillator including tube 21 is oscillating at a frequency determined primarily by the size of capacitance 27 and inductance 25, at a level of oscillation which is preferably arranged near the threshold of oscillation. The amplitude of oscillation is determined, inter alia, by the impedance of sensing inductance 13, since the voltage appearing across this inductance will directly influence the amount of feedback through capacitance 23 to the grid circuit of tube 21. This being so, variations in the impedance of sensing inductance 13 caused by the movements of metallic vane 17 cause in turn fluctuations of the oscillatory amplitude. Shome change in frequency due to changes of inductance in sensing inductance 13 with variations in the position of vane 17 may also be present, but any such changes in frequency are not detected or of any appreciable significance. The load impedance or Q also directly affects output for a given amplitude of oscillations, adding to the feedback effect. The loading of the plate circuit impedance is due to the eddy current losses in the metallic vane 17.

The output of the oscillator is detected or rectified by diode 45, amplified by the amplifier including tube 53, and applied to the servo restoring coil 15 through the cathode follower including tube 73. When the vane or movable force sensitive element 17 is moved by an external force in such a manner as to increase the impedance of sensing inductance 13, an increase in the oscillatory output is rectified, amplified and applied to servo restoring coil 15 which is arranged to restrain the movable element 17 from moving in the direction to cause said increase in oscillatory output.

Figure 2:
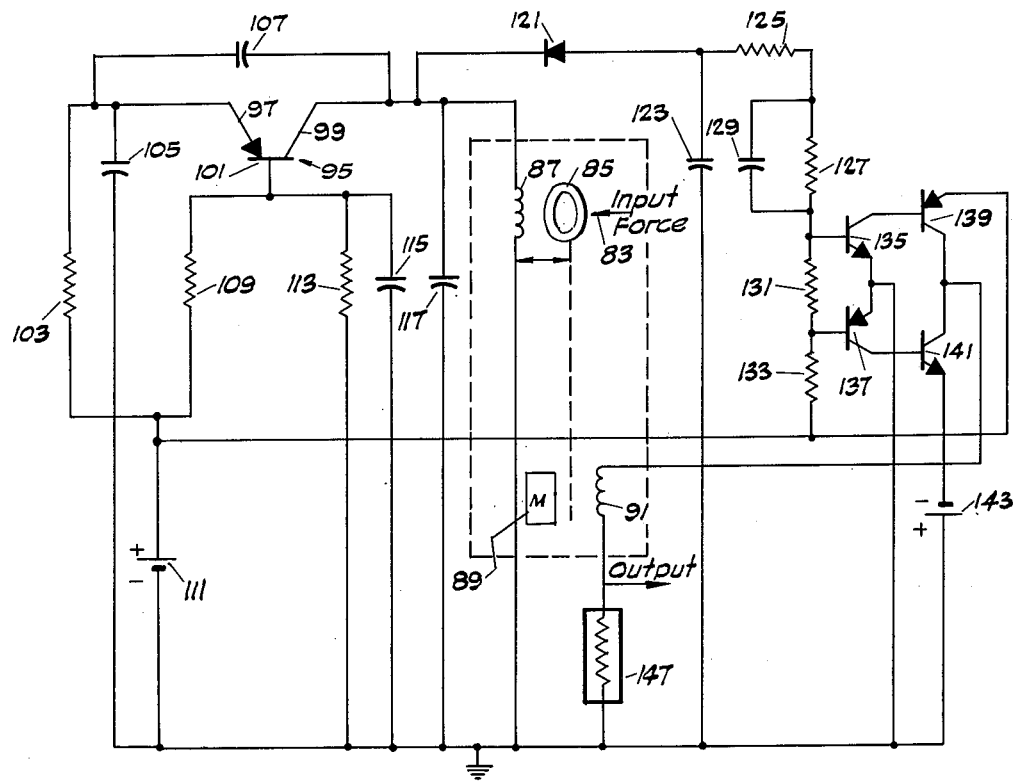
FIGURE 2 is a schematic diagram of another embodiment of the invention.

A transistorized version of the force measuring system is shown in FIGURE 2. It should be understood throughout this specification and the description, tht the oscillator, the rectifier, the phase correcting, and the impedance matching systems may all be varied in accordance with the art in the respective fields, and that this invention relates to the combination of these elements to produce the desired result.

In FIGURE 2, a transistor 95, consisting of an emitter 97, a base 101 and a collector 99, together with its associated elements, forms an oscillator similar to the oscillator in FIGURE 1. The collector 99 is connected to a load circuit including a sensing inductance 87 and a capacitance 117, which are the primary frequency-determining elements of the circuit. The emitter circuit includes a resistance 103 and a capacitance 105. Proper operating potentials for the oscillator are furnished by battery 111.

Resistance 109 and resistance 113 provide proper bias to base 101 of transistor 95. Capacitance 115 by-passes resistance 113. Capacitance 105 serves both to by-pass resistance 103 and to shift the phase of the feedback energy. Capacitance 107 serves as a feedback capacitance from the collector 99 to the emitter 97 and is chosen of such a value to just maintain oscillation when sensing inductance 87 presents minimum impedance—i.e., when the movable force sensitive element 85 is in its closest position to sensing inductance 87. The force sensing system in FIGURE 2 is enclosed in dotted lines and includes sensing inductance 87, movable force sensitive element 85, magnet 89, and servo restoring coil 91 operating in conjunction with said magnet 89 to restrain the motion of movable element 85 when said movable element 85 tends to move in response to an input force 83.

Inductance 87 and capacitance 117 are normally tuned to a frequency within the usual radio frequency range. Variations in the position of movable element 85 cause inductance 87 to present varying amounts of impedance. As the amount of impedance offered by inductance 87 increases, greater amounts of collector energy are fed back through feedback capacitance 107 to emitter 97, and the level of oscillations is increased. There may be some frequency change with these variations in the particular embodiment shown in FIGURE 2, but this frequency change not used or detected, and may be disregarded. The voltage provided by battery 111 is normally within the range of from 1 to 60 volts.

The output of the oscillator is detected or rectified by diode 121, and the D.C. output appears across capacitance 123, and across the network including resistances 125, 127, 131 and 133 in series. Capacitance 129 is in parallel with resistance 127. Resistances 125, 127, 131 and 133 are arranged to provide the proper D.C. bias to the bases of transistors 135 and 137. Diode 121 may be reversed, and resistance 133 in such a case is connected to battery 143 instead of battery 111 in order to reverse the polarity. Transistors 135 and 137 are arranged as direct-coupled cascaded amplifiers, and in the configuration shown in FIGURE 2, handle the signals in the positive direction. Transistors 139 and 141 are direct-coupled cascaded amplifiers, and in the configuration shown in FIGURE 2, handle the signals in the negative direction. Transistors 135, 137, 139 and 141 connected as shown comprise a D.C. coupled complementary symmetrical amplifier.

Resistance 133 is chosen of a high enough value to hold the voltage at resistance 131 to nearly zero. Resistance 131 is normally very small to provide a slight forward bias for each of the two sets of transistors 135 and 137, and 139 and 141.

Capacitance 129 serves to provide a phase lead to frequencies in the range of the servo cut-off in order to prevent the system as a whole from oscillation, and also to insure a good damping factor. The output from transistors 135, 137, 139 and 141 is fed directly through the servo restoring coil 91 and through the terminating impedance 147.

By a proper choice of the terminating impedance 147 the force measuring system of FIGURE 2 may be made to serve a number of different uses. For example, when output impedance 147 is a resistance, the system serves as an accelerometer, or with an appropriate transducer, pressure, weight, rate of flow, etc. If the output impedance 147 is inductive, the system serves to measure the rate of change of acceleration or pressure, etc., and if the output impedance is capacitative the system may be employed as a velocity meter.

In the operation of the circuit of FIGURE 2, an input force 83 is caused to act on movable element 85. The change in position of movable element 85 with respect to sensing inductance 87 causes a change in the impedance of the collector load circuit. Movable element 85 has the effect of a shorted turn on sensing inductance 87. The change in impedance of sensing inductance 87 causes, in turn, a change in the level of oscillations, and this change in the output level is rectified by diode 121. The output of diode 121, in turn, is applied to the symmetrical amplifier system described hereinabove which includes transistors 135, 137, 139 and 141. The output of these transistors is fed through servo restoring coil 91 which reacts, in conjunction with magnet 89, to restrain the movement of movable element 85 which was induced by input force 83.

The circuit is normally arranged so that the output from the symmetrical amplifier is just enough to balance the input force. The total movement of the movable force sensing element 85 is normally less than a few thousandths of an inch over the entire range of measurements.

Figure 3:
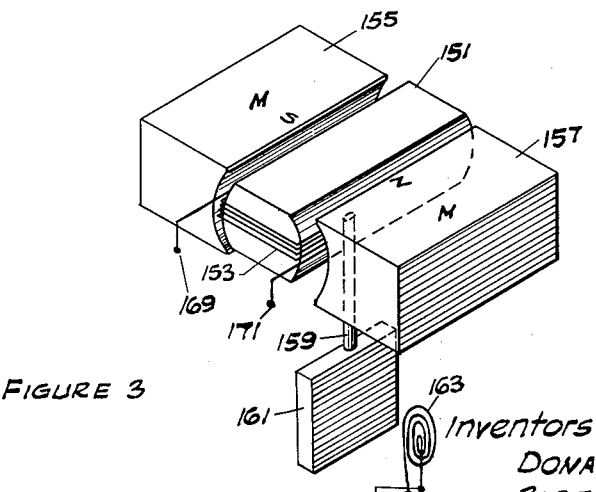
FIGURE 3 is a perspective view of the main elements of a typical force sensing system.

In FIGURE 3 a typical force sensing system is shown to be comprised of magnets 155 and 157 arranged so that lines of flux link servo restoring coil 153 wound on core 151. The ends of servo restoring coil 153 are brought out to terminals 169 and 171. Affixed to core 151 by a shaft 159 is a metallic paddle 161. The sensing inductance 163 is pancake wound to provide good sensitivity to the positioning of paddle 161. The ends of sensing inductance 163 are brought out to terminals 165 and 167.

In the operation of the embodiment of FIGURES 3, a force—for example, an acceleration—tends to cause movement of movable element 161. If the acceleration is to the left, movable element 161 tends to move closer to sensing inductance 163. This motion lowers the effective Q of inductance 163 and through the circuit of an amplifier and a rectifier, such as that shown in FIGURE 1 or FIGURE 2, is caused to change the current in servo restoring coil 153, thereby preventing the movement of paddle 161 except by a very small amount.

It will be apparent tto those skilled in the art that various departures may be made from the invention described herein without departing from the spirit and scope thereof. The invention, therefore, is to be limited only by the claims that follow.

What is claimed is:

1. A force measuring system comprising: a force sensing system including a sensing inductance, a movable force sensitive element for changing the effective Q of said inductance, and a servo restoring coil for restoring the movement of said movable element; an oscillator including a loading circuit having said inductance arranged to vary the effective load with changes in the position of said movable element and feedback means arranged to cause said variation in said load to change the amplitude of oscillation; and means to apply said changes in amplitude to said servo restoring coil to oppose the motion of said movable force sensitive element.

2. In a force balance system, a metallic vane coupled to the force to be measured, a pancake-wound inductance positioned adjacent to said metallic vane so that its effective impedance is changed by variations in the position of said metallic vane, a radio frequency oscillator including said inductance as a part of its resonant circuit and having electrical constants such that changes in said impedance result in variations in the output amplitude of said oscillator, a detector for rectifying said variations in output, an amplifier for amplifying said rectified output, a servo restoring coil for restraining the motion of said metallic vane, and impedance matching means coupling the amplifier output to said servo restoring coil.

3. In a force measuring system, a radio frequency oscillator having a tuned circuit including a sensing inductance, the constants of the tuned circuit being chosen so that the oscillator operates substantially as a class A oscillator, a movable element formed of conducting nonmagnetic material positioned adjacent the sensing inductance and being adapted to intersect the lines of force from the sensing inductance and to couple losses with the sensing inductance to thereby change the Q of the tuned circuit, means for rectifying the output of the oscillator, a servo restoring coil for controlling movement of said element, and impedance matching means connecting the restoring coil to the rectifying means.

4. A force measuring system as in claim 3 together with a D.-C. amplifier connected between the rectifying means and the impedance matching means.

5. In a force measuring system, a radio frequency oscillator having a tuned circuit including an air core inductance, a movable element of conducting non-magnetic material positioned adjacent the inductance and being adapted to intersect the lines of force from the inductance to thereby change the Q of the inductance, the oscillator being arranged so that changes in Q of the inductance result in modulation of the amplitude of the output of the oscillator, means rectifying the output of the oscillator, a servo restoring coil for restraining movement of said element, and impedance matching means connecting said rectifying means to said servo restoring coil.

6. A force measuring system as in claim 3 wherein said oscillator includes a vacuum tube having plate, grid and cathode elements, and wherein the amplitude of the output from the plate is modulated.

7. A force measuring system as in claim 3 wherein said oscillator includes a transistor having collector, emitter and base elements, and wherein the amplitude of the output from the collector is modulated.

8. In a force measuring system, a radio frequency oscillator having a tuned circuit including an air core inductance, a movable element of conducting non-magnetic material positioned adjacent the inductance and being adapted to intersect the lines of force from the inductance to thereby change the Q of the inductance, the element being movable from a normal position away from and towards the inductance, the constants of the tuned circuit being chosen so as to achieve unity loop gain without saturation with the element in its substantially normal position so that as the element is moved from its normal position the loop gain is modulated, means rectifying the output of the oscillator, a servo restoring coil for restraining movement of the element, and impedance matching means connecting the output of the rectifying means to the servo restoring coil.

9. A force measuring system as in claim 8 together with a D.-C. amplifier connected between the rectifying means and the servo restoring coil.

10. A servo type force balance system including: an oscillator operating near its threshold of oscillation and having a load circuit including an inductance, a metallic vane positioned near said inductance and having a tendency to move in accordance with the force applied to it, the movement of said vane inducing variable losses into the inductance to thereby vary the output of the oscillator, restraining means connected to said vane and coupled to the output of the oscillator to apply a restraining force to the vane to balance the force applied to the vane, and means coupled to the output of the oscillator and indicating the force tending to move the vane.

11. A force measuring system comprising an oscillator arranged to oscillate near its threshold of oscillation at a radio frequency, said oscillator including a resonant circuit having an air core inductance, a metallic vane of conducting non-magnetic material positioned to cause changes in the effective Q of said resonant circuit with changes in its position due to its effect on said inductance to thereby cause variations in the output of the oscillator, the force to be measured tending to shift the position of the vane, means coupled to the output of the oscillator ot detect variations in the output of the oscillator, a servo restoring coil connected to the metallic vane and coupled to the detecting means, means for establishing a magnetic field in the vicinity of the servo restoring coil, the detecting means producing a current flow in the servo restoring coil proportional to the force applied to the vane so that the servo restoring coil produces a restoring force to the vane to balance the force tending to shift the position of the vane, and an output impedance connected in series with the servo restoring coil so that the current flowing in the restoring coil also flows in the output impedance and produces an output signal across the output impedance indicating the force tending to shift the position of the vane.

12. A force measuring system including a transistor having an emitter, a base and a collector, a resonant circuit connected to said collector, said resonant circuit including an inductance and a capacitance, a movable metallic vane positioned near said inductance to affect the impedance thereof to thereby change the effective Q of said resonant circuit with a change in the position of the vane with respect to the inductance, the force being measured tending to shift the position of the vane, feedback means connected between said collector and said emitter of a size to just cause oscillations at a predetermined spacing between the vane and the inductance, means to detect said oscillations, means forming a magnetic field, and a servo restoring coil connected to said vane and coupled to the output of the detecting means, said servo restoring coil being disposed in said magnetic field and yieldably restraining said vane against substantial movement by the force tending to move said vane.

13. A force measuring system comprising: magnetic means creating lines of flux, a servo restoring coil arranged to link said lines of flux, a metallic vane coupled to said servo restoring coil, the vane having a tendency to move in response to the force being measured, a sensing inductance positioned adjacent to said vane, an external circuit linking said sensing inductance to said restoring coil, said external circuit including an oscillator having a resonant circuit with said sensing inductance forming a part of the resonant circuit, said oscillator also having a feedback coupling of such a size that variations in the effective Q of the resonant circuit are induced in the resonant circuit by changes in position of the vane relative to the inductance to thereby cause variations in the output of the oscillator, said oscillator being arranged to oscillate near its threshold of oscillation at a radio frequency, means coupling said variations in the output of the oscillator to said servo restoring coil to cause current flow in said servo restoring coil and to thereby create a restoring force on the vane which balances the force tending to move the vane, and means connected to the coupling means to indicate the force tending to move the vane.

14. In a force measuring system, a radio frequency oscillator having a tuned circuit including a sensing inductance, the constants of the tuned circuit being chosen so that the oscillator operates substantially as a class A oscillator, a movable element formed of a conducting non-magnetic material positioned adjacent the sensing inductance and being adapted to intersect the lines of force from the sensing inductance to thereby modify the Q of the inductance, the changing of the Q of the inductance causing modulation of the amplitude of the radio frequency oscillations, the amplitude of the radio frequency oscillations being controlled by the position of the movable element with respect to the inductance, means for rectifying the modulated output of the oscillator, a servo restoring coil connected to the movable element and coupled to the rectifying means, and means forming a magnetic field in the vicinity of the restoring coil so that current flow in the restoring coil applies a restoring force to the movable element to balance the force applied to the movable element.

References Cited in the file of this patent

UNITED STATES PATENTS

| | | |
|---|---|---|
| 2,593,339 | Ostermann et al. | Apr. 15, 1952 |
| 2,614,163 | Roper | Oct. 14, 1952 |
| 2,790,145 | Bartelink | Apr. 23, 1957 |
| 2,847,625 | Popowsky | Aug. 12, 1958 |
| 2,849,669 | Kinkel | Aug. 26, 1958 |